United States Patent
Aso et al.

[11] Patent Number: 5,953,313
[45] Date of Patent: Sep. 14, 1999

[54] CIRCUIT SWITCHING CONTROL METHOD FOR MULTIPLEX COMMUNICATION EQUIPMENT

[75] Inventors: Ikuo Aso; Kazumasa Azuma; Kaoru Suzuki; Sakae Watanabe, all of Koriyama, Japan

[73] Assignee: Hitachi Telecom Technologies Ltd., Koriyama, Japan

[21] Appl. No.: 08/796,032

[22] Filed: Feb. 5, 1997

[30] Foreign Application Priority Data

Feb. 19, 1996 [JP] Japan ................................. H8-030342

[51] Int. Cl.$^6$ .............................. H04J 3/14; H04L 12/26
[52] U.S. Cl. .......................... 370/220; 370/237; 370/354; 370/468
[58] Field of Search .................................. 370/360, 237, 370/216, 217, 220, 235, 352, 353, 354, 357, 465, 468, 477; 395/181, 182.01, 182.02; 340/825.03, 826, 827

[56] References Cited

U.S. PATENT DOCUMENTS

| | | | |
|---|---|---|---|
| 4,119,815 | 10/1978 | Frankfort et al. | 379/216 |
| 5,515,418 | 5/1996 | Yamaguchi et al. | 379/34 |
| 5,661,725 | 8/1997 | Buck et al. | 370/377 |
| 5,673,253 | 9/1997 | Shaffer | 370/229 |
| 5,675,577 | 10/1997 | Komatsu | 370/237 |

*Primary Examiner*—Alpus H. Hsu
*Attorney, Agent, or Firm*—Antonelli, Terry, Stout & Kraus, LLP

[57] ABSTRACT

A multiplex communication equipment which can switch circuits and which enables cost saving in circuit usage of a public network when the circuit is switched. Multiplex communication equipment 1 with circuit switching control, which is selectively connected to either an active circuit 5, having a large transmission line, or a spare circuit 6, having limited transmission line. A data terminal interface (I/F) 18 is connected to data terminal equipment 2, and a voice terminal I/F 17 is connected to voice terminal equipment 3. An active circuit I/F 13 is connected to circuit 5, and a spare circuit I/F 14 is connected to circuit 6. A multiplexing control section 16 multiplexes data and voice information, and a circuit switching section 15 switches circuits. A control section 11 controls the aforementioned sections, and a memory 12 stores multiplexed information of the active circuit and the spare circuit and circuit switching information, and keeps circuit speed slow by multiplexing minimum required information only at the spare circuit, thus saving the circuit usage charge.

1 Claim, 3 Drawing Sheets

CIRCUIT SWITCHING CONTROL METHOD FOR MULTIPLEX COMMUNICATION EQUIPMENT

BACKGROUND OF THE INVENTION

This invention relates to multiplex communication system technology and relates to a circuit switching method for multiplex communication equipment where multiple communication channels are used by switching, and in particular, relates to a circuit switching control method for multiplex communication equipment where switching is made between an active circuit and a spare circuit.

There is a known method to transfer data by connecting two pieces of data terminal equipment (hereinafter called "DTE") using a high speed digital circuit and a method to transfer voice information by connecting two pieces of voice terminal equipment, such as telephones or facsimile equipment, using a high speed digital circuit.

In the former case, the two DTE's are constantly connected for data transfer, and both DTE's are connected by connection data.

In the latter case, communication is achieved by making a call connection based on dial information each time a call is made.

In the past, these two communication methods were not made on the same circuit because of the difference in connection method.

On the other hand, a multiplex communication system is being considered where a circuit is efficiently used by transferring data and voice information on the same high speed digital circuit.

The concept of such multiplex communication system is explained using FIG. 3. A multiplex communication system is constructed by connecting multiplex communication equipment 1, accommodating multiple pieces of DTE 2 and multiple pieces of voice terminal equipment 3, and multiplex communication equipment 1', accommodating multiple pieces of DTE2' and multiple pieces of voice terminal equipment 3', via a high speed digital circuit 4.

The transmitting side DTE 2 and the receiving side DTE 2', where data transfer is made constantly, are fixedly connected in advance between each other using a certain channel (CH1–CH3) of high speed digital circuit 4. Such fixed connection is achieved by securing a band for fixed connection within high speed digital circuit 4 on a priority basis.

A communication between a calling side voice terminal equipment 3 and a receiving side voice terminal equipment 3', which could take place at any time, is achieved by using one of the necessary channels (CH4–CH6) of the high speed digital circuit 4, and a call connection is made by using a control or Dp channel (DpCH).

For example, when a call is made from #100 voice terminal 3 to #201 voice terminal 3', multiplex communication equipment 1 captures an open channel (CH4) of circuit 4 based on the dial information to secure a transmission line to multiplex communication equipment 1', and then transfers call connection data, created based on the dial information, to multiplex communication equipment 1' via the Dp channel of circuit 4.

Multiplex communication equipment 1' on the receiving side accomplishes connection with #201 voice terminal equipment 3' based on the call connection data received via the Dp channel.

Next, when a call is from #102 voice terminal equipment 3 to #200 voice terminal equipment 3', multiplex communication equipment 1 captures an open channel (CH5) of circuit 4 based on the dial information to secure a transmission line to multiplex communication equipment 1', and then transfers call connection data, created based on the dial information, to multiplex communication equipment 1' via the Dp channel of circuit 4.

Multiplex communication equipment 1' on the receiving side accomplishes connection with #200 voice terminal equipment 3' based on the call connection data received via the Dp channel.

Next, when a call is made from #202 voice terminal equipment 3' to #101 voice terminal equipment 3, multiplex communication equipment 1' captures an open channel (Ch6) of circuit 4 based on the dial information to secure a transmission line to multiplex communication equipment 1, and then transfers call connection data, created based on the dial information, to multiplex communication equipment 1 via the Dp channel of circuit 4.

Multiplex communication equipment 1 on the receiving side accomplishes connection with #101 voice terminal equipment 3 based on the call connection data received via the Dp channel.

By providing such a structure, voice information can be transferred to the other voice terminal equipment dynamically, in other words on as required basis, while transferring data constantly, on the same circuit.

In such a multiplex communication system, it becomes necessary to have a spare circuit to enable continuation of transmission in case of circuit accident. For example, a circuit switching method is known whereby a spare circuit is connected at the same communication speed as the active circuit when switching from the active circuit to the spare circuit in a communication system having an active circuit and a spare circuit. Under this switching method, when the circuit switching control equipment connects to the spare circuit, the spare circuit requires connection at the same communication speed as the active circuit or at a communication speed covering the communication speed of the active circuit.

Under this switching method, even if there is some data with low necessity or a band normally not used in the active circuit, the total bandwidth of the private line, including those low usage rate items, will have to be secured in the spare circuit, resulting in a problem of wasteful cost incurred due to the unused band when a public network is used as the spare circuit.

As explained above, under the conventional circuit switching method, the usage rate of the switched circuit is low and so there will be a wasteful cost for using the circuit.

SUMMARY OF THE INVENTION

This invention provides circuit switching method which enables enhancement of the circuit usage rate at the time of circuit switching, and which minimizes the circuit usage cost in a multiplex communication system having an active circuit and a spare circuit.

Furthermore, this invention provides a circuit switching method which enables enhancement of the circuit usage rate at the time of switching from an active circuit to a spare circuit and minimizes the spare circuit usage cost in a multiplex communication system where both the fixed connection for data transfer and the dynamic connection for transferring voice information from voice terminal equipment, such as a telephone or a facsimile equipment, by connecting dynamically (on demand) are accomplished on the same circuit.

In order to achieve the above mentioned purposes, a system under this invention provides a memory where band allocation information which needs to be communicated to the spare circuit and communication speed information for connecting to the spare circuit are stored, selects data and voice information which are to be switched to the spare circuit based on the band allocation information as stored in the memory, multiplexes those data and voice information according to the communication speed information, and makes the connection via the spare circuit, for circuit switching.

As a result of employing such construction, this invention can secure the minimum required data communication speed for switching to the spare circuit and can minimize the cost for using the circuit.

PREFERRED EMBODIMENTS OF THE INVENTION

Figure 1:
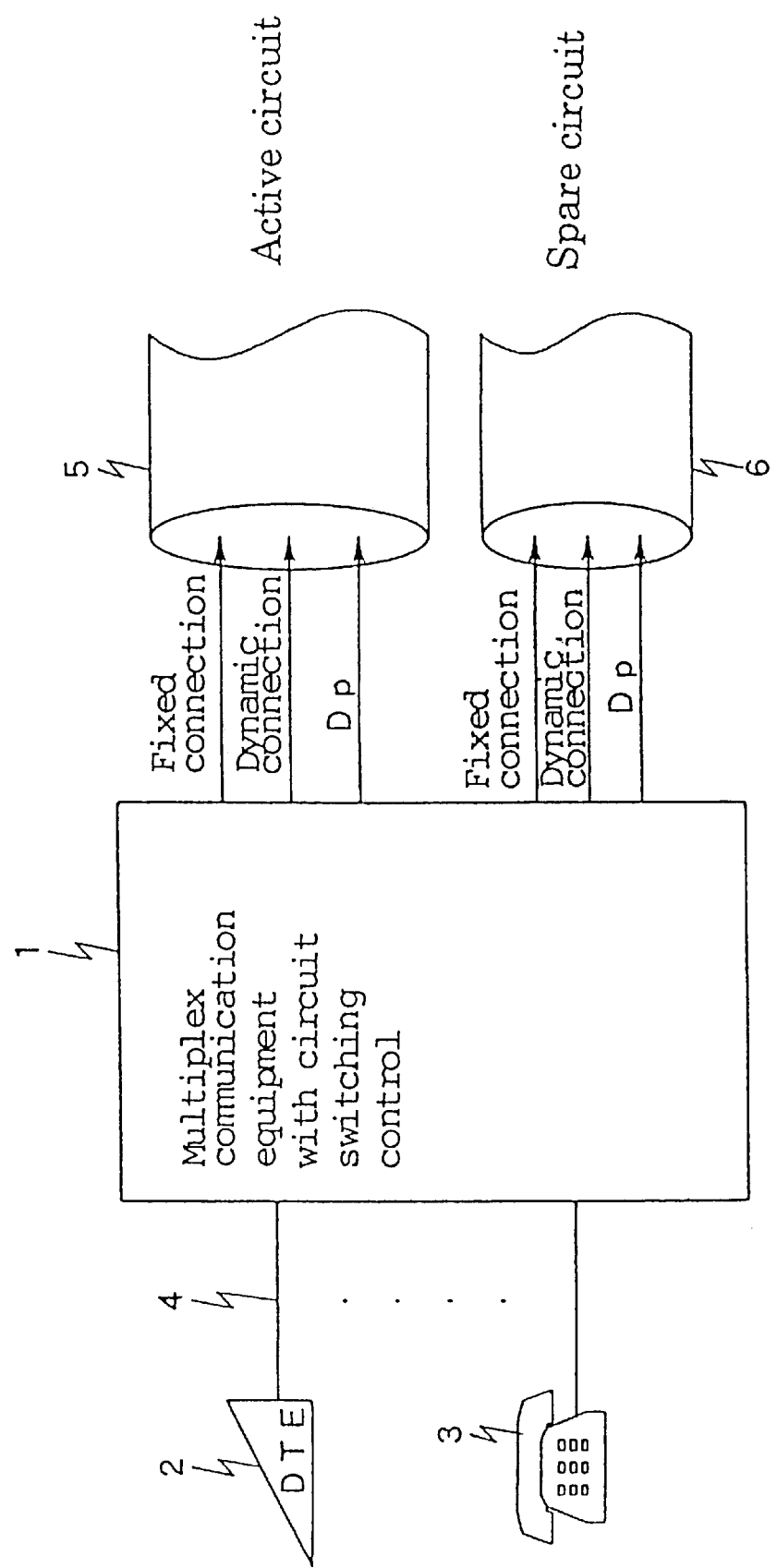
FIG. 1 is a conceptual drawing which explains the structure of a multiplex communication system employing the circuit switching method of this invention.

This invention is explained below using the drawings. FIG. 1 is a system configuration drawing which shows the outline of the structure of a multiplex communication system in which this invention is applied.

In a multiplex communication system in which this invention is applied, multiplex communication equipment 1, which includes circuit switching control accommodating multiples pieces of DTE 2 and multiple pieces of voice terminal equipment 3, such as telephone and facsimile equipment, via cable 4 is structured to be connected by switching to either the active circuit 5 with a large transmission capacity or to the spare circuit 6 with limited transmission capacity.

A public network may be used as spare circuit 6.

When transmitting data to other pieces of DTE or transmitting voice information to other pieces of voice terminal equipment, DTE2 and voice terminal equipment 3 transmit data and voice information to multiplex communication equipment 1 via cable 4. Multiplex communication equipment 1 multiplexes data and voice information efficiently based on multiplexing information stored within equipment 1 corresponding to the communication speed of active circuit 5, and makes communication by sending out data by a fixed connection and voice information by a dynamic connection to active circuit 5.

In this multiplex communication system, the same circuit is used by dividing into two bands, a fixed connection band and a dynamic connection band, and a fixed connection is previously made in the fixed connection band based on the fixed connection data, and a dynamic connection is made in the dynamic connection band dynamically (according to the request for connection), and it is structured in away that the call connection data for the dynamic connection is transmitted via the Dp channel.

When switching from active circuit 5 to spare circuit 6, a fixed connection band for high priority data is first secured within the spare circuit, then a fixed connection band for the next priority data is secured, and the remaining band is used as a dynamic connection band based on the multiplexing information stored, within itself according to the communication speed of spare circuit 6. Thus data and voice information are efficiently multiplexed, and communication using spare circuit 6 is accomplished.

Figure 2:
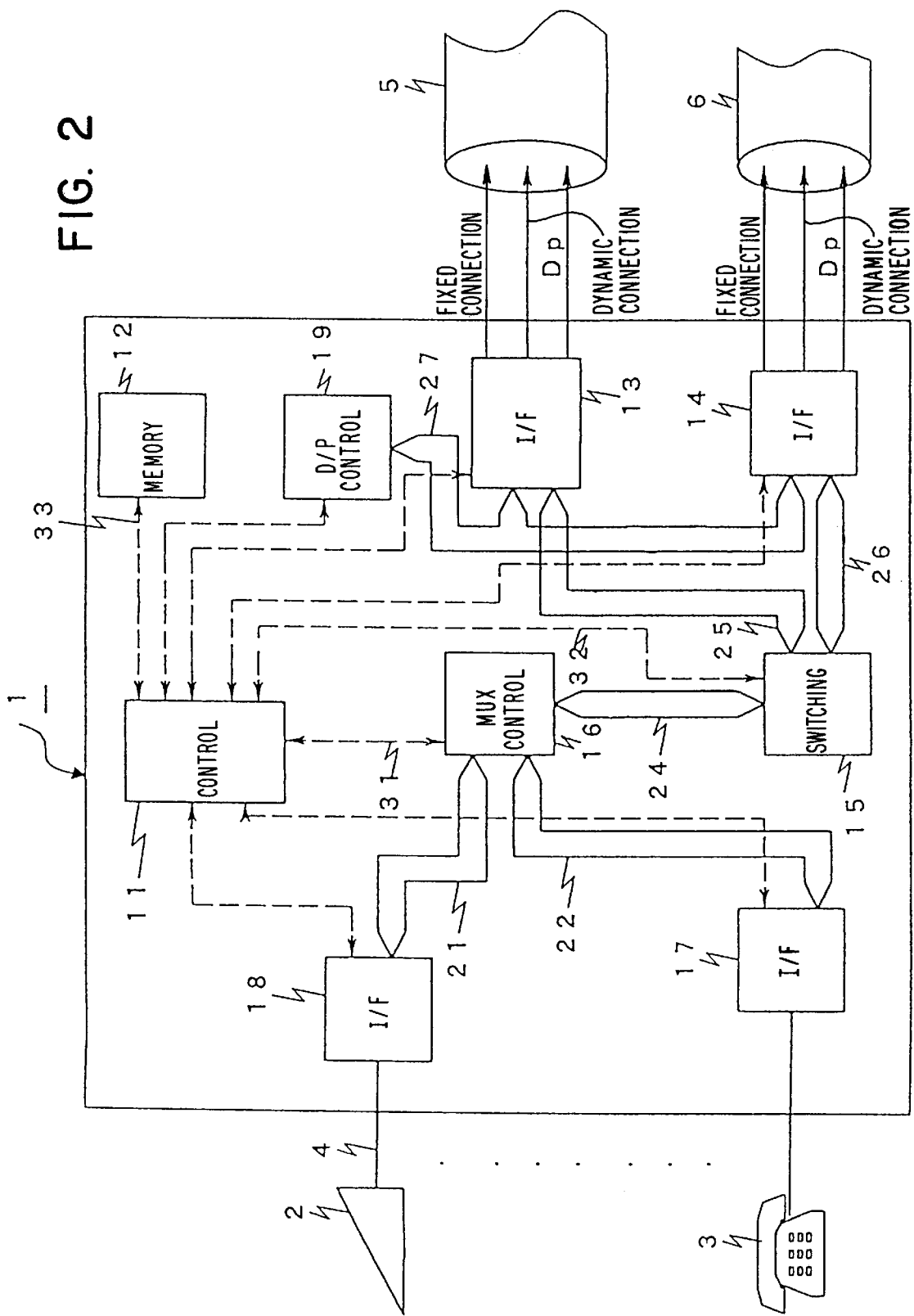
FIG. 2 is a functional block diagram which shows the structure of the multiplex communication equipment with circuit switching control used in the circuit switching method of this invention.
Figure 3:
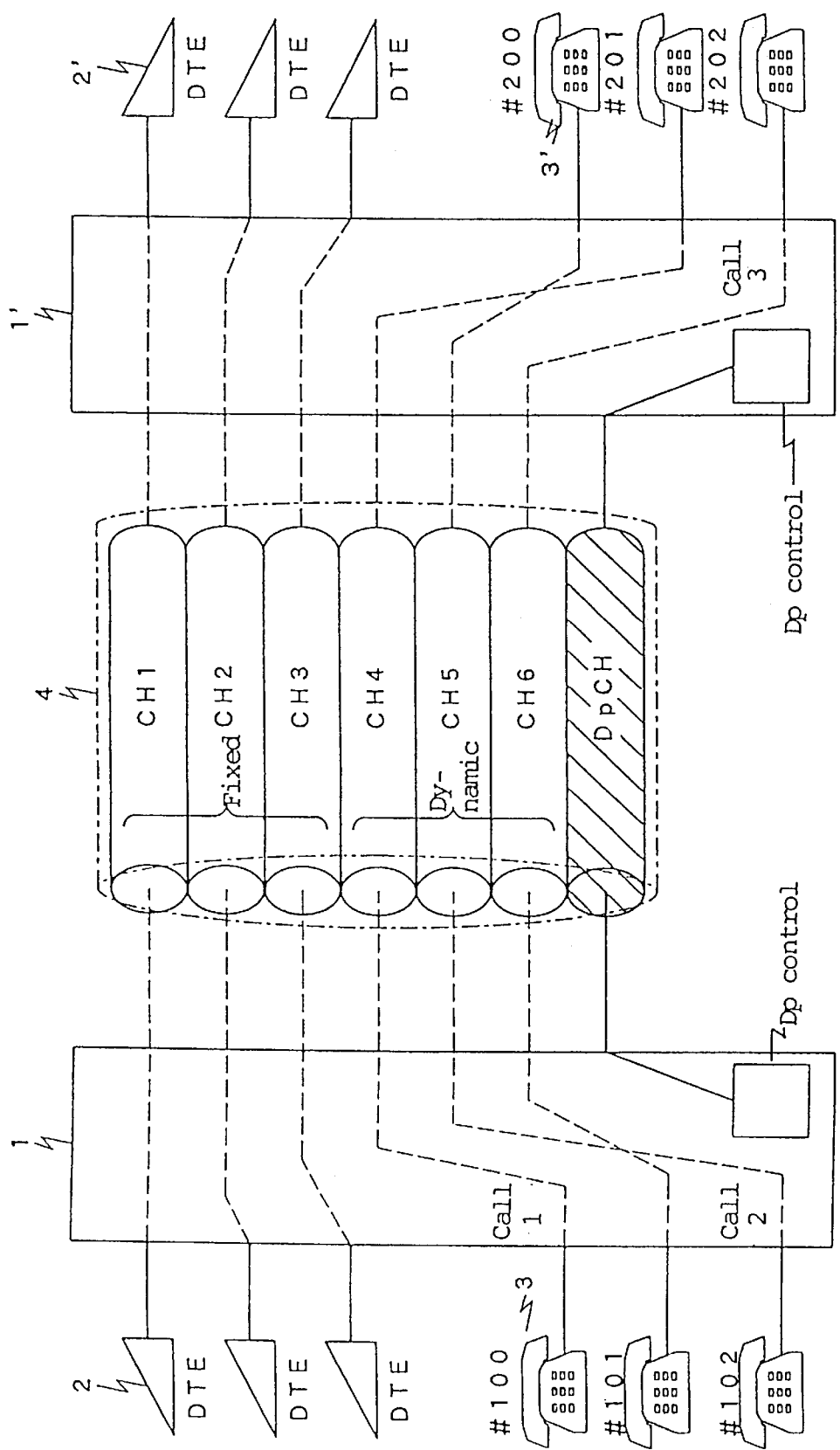
FIG. 3 is a conceptual drawing which explains the structure of a communication system where a fixed connection and a dynamic connection are achieved using the same circuit.

The structure of multiplex communication equipment 1 (with circuit switching control) is described in FIG. 2. Reference numbers which already appeared in FIG. 1 indicate the same items as in FIG. 1, and therefore explanation is omitted. Multiplex communication equipment 1, which has circuit switching control, comprises a control section 11, a memory 12, an active circuit interface (I/F) section 13, a spare circuit I/F section 14, a switching section 15, a multiplexing control section 16, a voice terminal I/F section 17, a DTE I/F section 18 and a Dp control section 19.

Control section 11 registers and reads out data or voice information, for which connection will be maintained even at the time of switching to a spare circuit, and communication speed information 33 to and from memory 12.

Control section 11 instructs multiplexing control section 16 to execute multiplexing processing by means of multiplexing control information 31 based on the aforementioned communication speed information 33, efficiently multiplexes the data of DTE I/F section 18 and voice terminal I/F section 17 corresponding to the active circuit or the spare circuit by providing circuit switching information 32 to switching section 15, and further controls as to which of active circuit I/F section 13 and spare circuit I/F section 14 the connection should be made.

When the condition of active circuit 5 becomes abnormal, control section 11 instructs switching section 15 to perform switching by providing circuit switching information 32 so that data 21 received from DTE 2 via DTE I/F section 18, and data 22 received from voice terminal equipment 3 via voice terminal I/F section 17, which data are multiplexed by multiplexing control section 16, to become multiplexed data 24 which can be communicated through spare circuit 6 via spare circuit I/F section 14. At this time, efficiently data communication on spare circuit 6 is achieved by reading out multiplexing control information 31 for switching from memory 12 based on communication speed information 33 and providing the multiplexing control information to multiplexing control section 16.

When the condition of spare circuit 6 becomes abnormal which being used, switching instruction is provided to switching section 15 by means of circuit switching information 32 so that data 21, received from DTE 2 via DTE I/F section 18, and data 22 received from voice terminal equipment 3 via voice terminal I/F section 17, which data are multiplexed to become multiplexed data 24 by multiplexing control section 16, can be communicated through active circuit 5 via active circuit I/F section 13. At this time, efficient data communication on active circuit 5 is achieved by reading out multiplexing control information 31 for switching from memory 12 based on communication speed information 33 and providing the multiplexing control information to multiplexing control section 16.

According to this invention, when a user desires to use a public network in case of emergency, such as active circuit trouble in a multiplex communication system having an active circuit and a spare circuit, the user is required only to register multiplexing information during the use of the public network into the memory, and the user is not required to make communication through the public network at a communication speed more greater than needed while the circuit is being switched, and as a result wasteful network usage charges are avoided.

We claim:

1. A method of controlling multiplex communication equipment to efficiently communicate multiplexed data, including voice data and digital data, said method comprising:

activating a private circuit as a communication circuit for transmission of the multiplexed data;

designating a public network as a spare circuit;

when the private circuit is impeded, switching the communication circuit from the private circuit to the public network;

performing an effective band allocation of the multiplexed data by fixed allocation and dynamic allocation;

storing in a memory communication speed information including priority data information for continuing the connection when the communication circuit is switched from the private circuit to the public network;

assigning a fixed allocation band of the public network for connecting the priority data information to the public network based on the communication speed information to provide a continuing connection of the priority data information when the communication circuit is switched from the private circuit to the public network, and at the same time, assigning a band of the public network, other than the fixed allocation band, as a call connection data band for transmitting and receiving call connection data and as a dynamic allocation band for dynamically connecting the communication according to the call connection data; and connecting only a band with a preset communication speed when switching the communication circuit from the private circuit to the public network.

* * * * *